Nov. 2, 1926.
J. KAISER
1,605,661
COMBINED SOUND RECORD AND PICTURE FILM
Filed Dec. 4, 1922     3 Sheets-Sheet 1
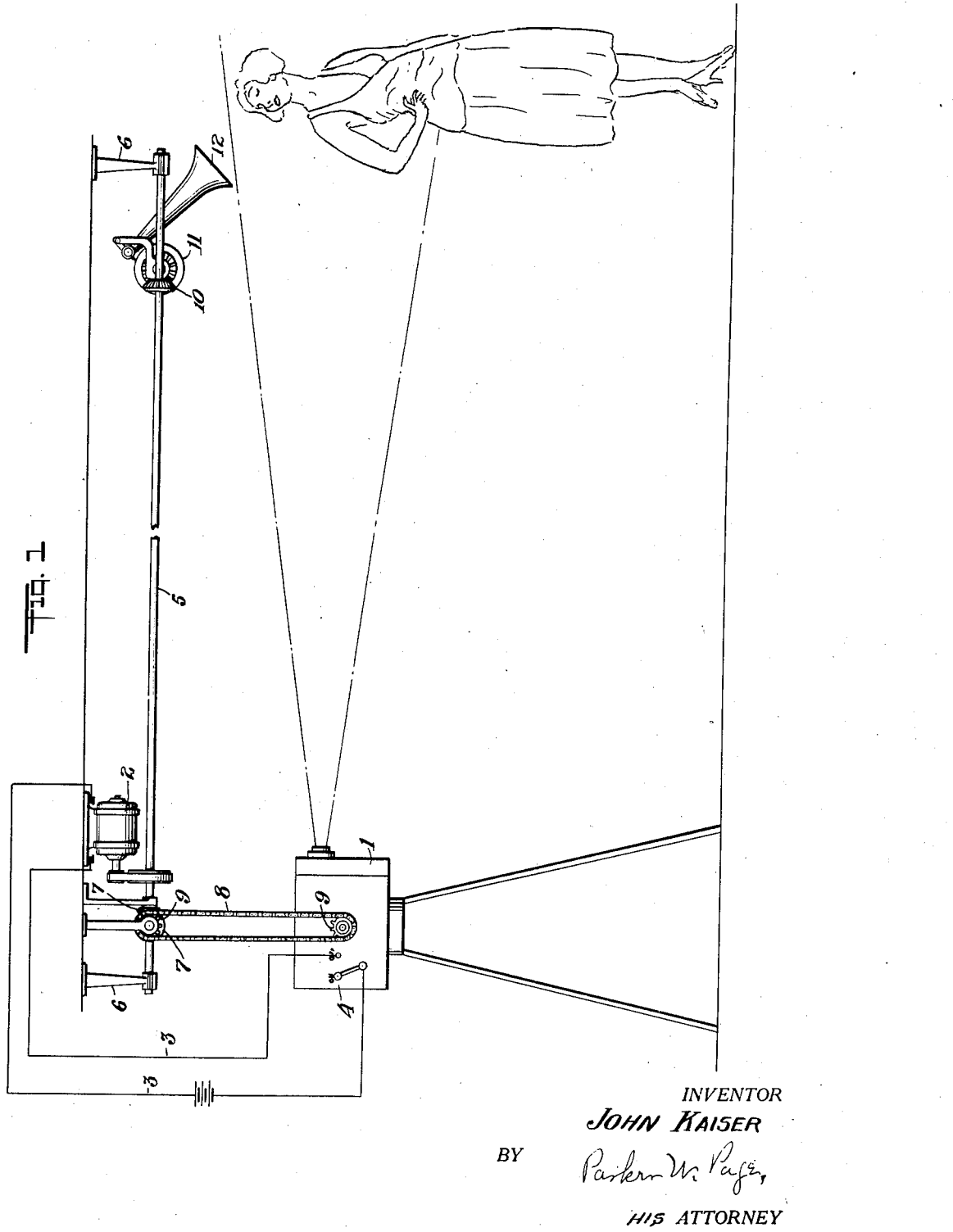
INVENTOR
JOHN KAISER
BY Parker W. Page,
HIS ATTORNEY Nov. 2, 1926.
J. KAISER
1,605,661
COMBINED SOUND RECORD AND PICTURE FILM
Filed Dec. 4, 1922  3 Sheets-Sheet 2
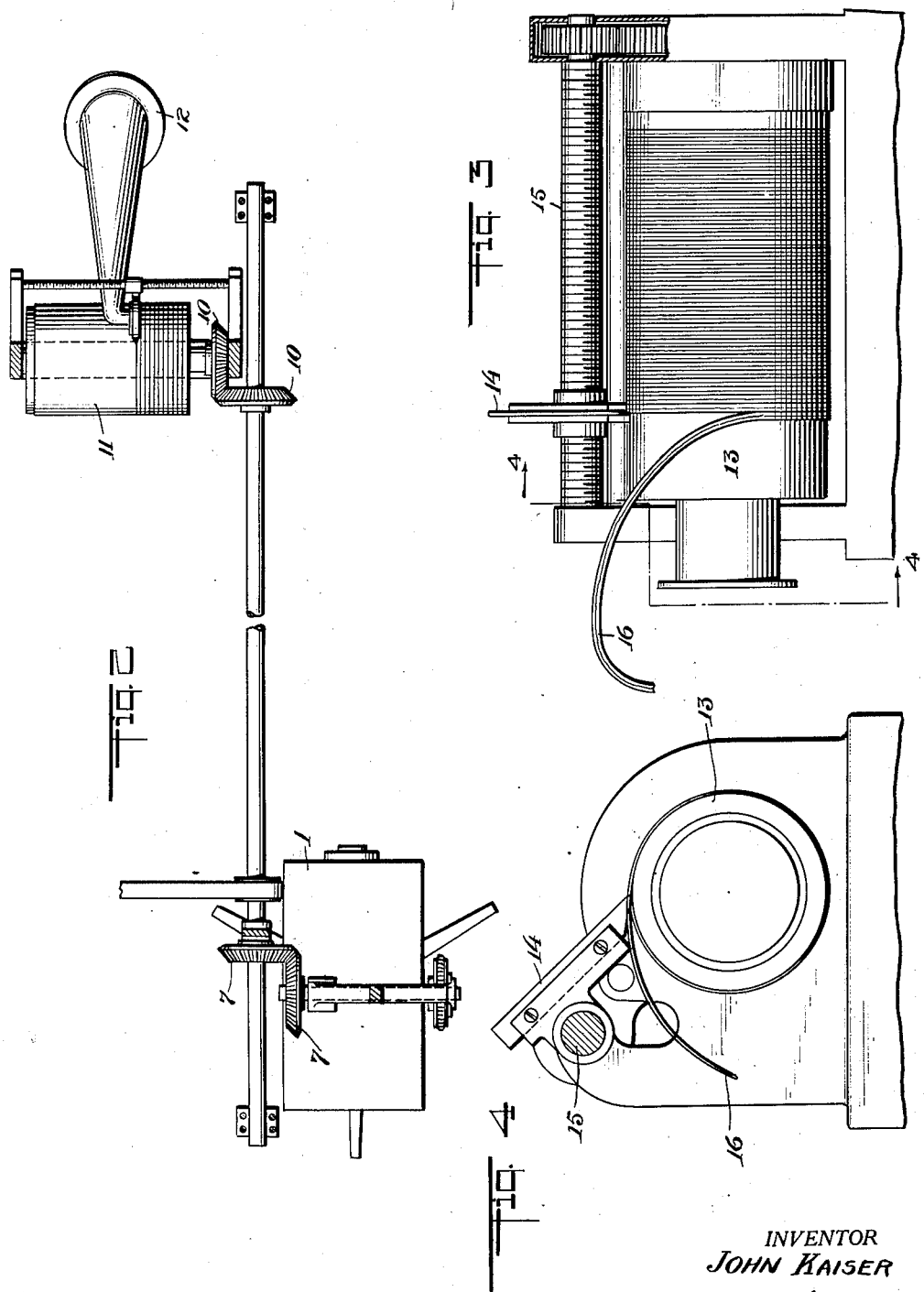
INVENTOR
JOHN KAISER
BY Parker W. Page,
HIS ATTORNEY

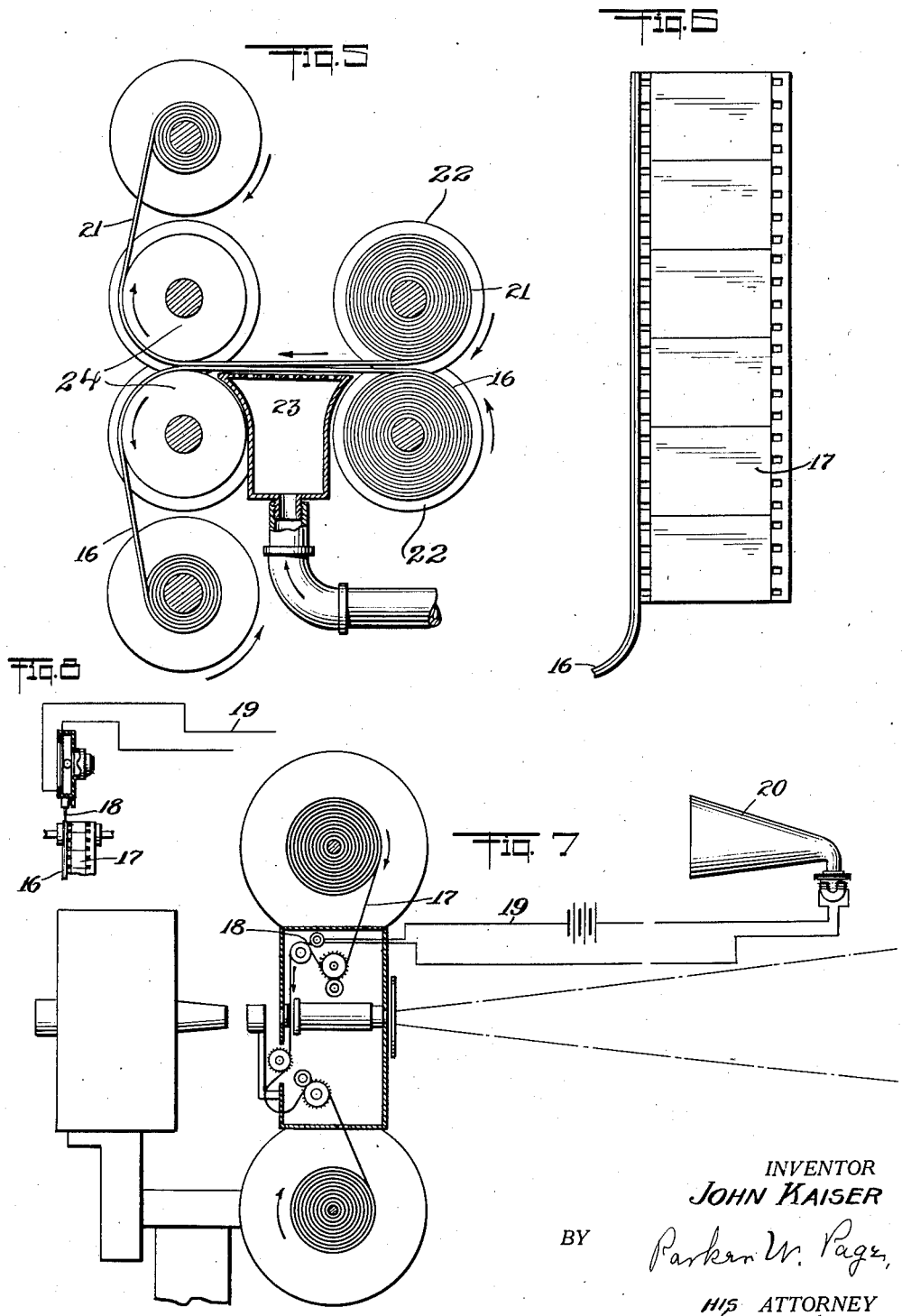

Patented Nov. 2, 1926.

1,605,661

UNITED STATES PATENT OFFICE.

JOHN KAISER, OF NEW YORK, N. Y.

COMBINED SOUND RECORD AND PICTURE FILM.

Application filed December 4, 1922. Serial No. 604,955.

In the motion picture industry, it has long been recognized as very desirable to combine with the projector which throws the picture on the screen, a phonographic device which will reproduce in a manner to be distinctly audible to the observer, the spoken words, or other sounds incident to the scene portrayed. Many schemes have been proposed and some have been more or less successfully practiced for accomplishing this result, but aside from the heretofore great difficulty met with in producing a satisfactory sound record capable of use with the picture projecting apparatus is the extreme difficulty encountered in so organizing the system or apparatus as to secure exact synchronism between the pictorial and the sound reproductions. It is manifest that any departure from such exact synchronism is fatal to the artistic and realistic effect of such reproduction, and the nearest approach to an economical and successful solution of the problem to my method of accomplishing it, is in the impracticable suggestion that the picture film be made with a sound record groove in its edge whereby a sound reproducing needle and accessories may travel in such groove, as the film strip passes before the projecting lens.
Recognizing the difficulties above referred to and seeking to provide a simple and inexpensive method of securing the desired result, I have devised the method hereinafter more fully set forth, and which in general terms may be thus defined.

I make use of no unusual forms of apparatus; I employ an ordinary motion picture camera for taking the pictures of moving objects and persons, and I drive this machine by a suitable motor, operated by hand or other power. The motion is, however, transmitted to the camera by a long shaft or spindle and suitable gears, and this shaft is of such length as to reach from the camera to the immediate vicinity of the persons or objects in its focus. At such point the spindle is geared to a sound recorder of the cylinder type, the gearing being such that the peripheral surface of the recording cylinder travels at exactly the same rate of speed as the film in passing back of the objective lens. The sound recorder is provided with the usual horn so that the voice of the performer or person photographed will be faithfully recorded on the wax cylinder.

When the pictures have been thus taken and the sound record completed, a matrix of the cylinder record is formed in the usual and well known manner and from this matrix, also by well known means, a celluloid cylindrical positive record is produced which is an exact reproduction of the original wax record. This celluloid cylinder is then cut in a long narrow strip, the line of division being between the record groove, or if so preferred, the metal matrix sheet is similarly cut and run together with a celluloid strip between pressure rolls under the proper conditions of temperature to impress the metal record in the celluloid strip. In either case the object is to obtain a long narrow celluloid or equivalent strip having in it a record groove, the lineal dimensions of which are manifestly the same precisely as those of the picture film taken together with the original record.

By simple and well understood means this sound record strip is pasted or united to the positive picture strip, preferably along one of its edges and outside the row of perforations in such strip which are provided for the sprocket wheels of the projector. It will be observed that the sound record strip is extremely narrow and there is always ample space along the edge of the picture film to receive it.

The picture projecting machine is provided with a reproducing needle and sound box and the former is adapted to travel in the sound record groove as the film is moved through the projector, the point of contact being on such part of the film as moves continuously and not intermittently, and the relation of the sound record to the pictures is so adjusted that the sounds reproduced will exactly synchronize with the pictures portrayed.

The sounds reproduced by the needle and sound box may be carried to an amplifier in proper position to throw the sounds out to the audience in such manner that they will appear to proceed directly from the mouths of the performers. The realistic effects of this method of exhibiting speaking pictures is most perfect and striking.

In the drawings hereto annexed, I have illustrated the apparatus used by me in carrying out this invention.

Fig. 1 is a general view of the arrangement of parts used in recording both pictures and sounds.

Fig. 2 is an enlarged plan view of the picture and sound recording device.

Fig. 3 is an enlarged view in elevation of the means for cutting up the celluloid cylindrical record.

Fig. 4 is an end view of the same.

Fig. 5 is a view partly in section and partly in elevation of the means for utilizing a cut matrix to form the sound record strip.

Fig. 6 is a view of a portion of the completed picture and sound film.

Fig. 7 is a general view partly in section of the reproducing means showing the relation of the parts, and Fig. 8 is a detail view of the needle and sound box bearing on the sound record strip.

In Fig. 1 the numeral 1 designates any ordinary motion picture camera, the figure of a girl being photographed, being shown as at a greater or less distance from the camera in proper focus. An electric motor 2 is here shown as the source of power for both the camera and the sound recorder, and this motor, controlled by a circuit 3 and a suitable switch 4 on or near the camera, is belted or geared to a long horizontal shaft 5, mounted in suitable bearings 6. Bevel gears 7 transmit the rotation of this shaft to the photographic machine by a chain belt 8 and sprockets 9, and at the remote end of the shaft 5 similar gears 10 transmit motion to the cylinder of the sound recording machine 11. The latter is provided with the usual recording needle, sound box and horn 12, which is in position to receive the voice of the performer and record the words, songs or what not.

As above indicated, a cylinder record when complete is electroplated to form a matrix, and from this matrix a sheet of celluloid in the form of a complete cylinder is impressed under the influence of steam heat and pressure to form a perfect record corresponding to that originally made in the wax cylinder. This celluloid sheet on a suitable mandrel 13 is then divided by a suitable cutting tool 14 into a long strip 16, the cutter being moved transversely by a screw 15 so as to trace a spiral path between the spiral groove of the record. This record strip 16 is then secured to the positive picture film 17 along one edge, as shown in Fig. 6, and this film is used in the ordinary way in a projector except that a reproducing needle and sound box 18 bears on a part of the record strip which is moving continuously through the machine. The sounds are carried by a circuit 19 to an amplifier 20 located at the proper point to give the desired effect.

As I have stated before, the copper or sheet metal matrix may be cut spirally into a long strip, and the sound record strip formed directly therefrom, if so desired. A device for this purpose is shown in Fig. 5 in which 21 is the matrix strip and 16 the celluloid strip, which may be either the picture film itself or a narrow strip to be secured thereto. The two strips are run from rolls 22 over a steam table 23 which softens the celluloid and then superposed between pressure rolls 24, by means of which the record is impressed in the celluloid strip. The latter may then be attached to the picture film, if it is not itself such film, and the matrix strip used repeatedly for the production of other record strips.

The primary object in this case has been simplification of methods and devices while securing perfect accord or synchronism between pictures and sounds. In practice the effect is startlingly real and natural.

I am aware that it has been proposed to attach to a motion picture film a narrow strip having impressed therein a record of the sounds, incident to the action portrayed by the pictures, but no method of producing such a sound record, so far as I am aware, has ever been proposed or is known. I do not therefore claim this plan herein but base my claims upon the novel means I have developed for making such a sound record for this purpose.

What I claim as my invention is:

1. The method of producing combined motion picture and sound record films herein described which consists in forming from a cylindrical wax record taken at the same rate as the picture, a celluloid record sheet, cutting said sheet into a narrow strip between the record groove and attaching said strip to the picture film.

2. The method of producing combined motion picture and sound record films herein described, which consists in forming from a cylindrical wax record taken at the same rate as the picture a metal matrix, cutting the matrix into a long strip spirally between the said grooves, impressing the matrix record into a celluloid strip, and attaching said strip to the picture film.

3. The method of producing combined motion picture and sound record film which consists in forming from a cylindrical wax record taken concomitantly with the picture film, a matrix, cutting said matrix into a narrow strip and between the turns of the record groove, and impressing said matrix strip against the edge of said picture film whereby the sound record corresponds with the adjacent views.

4. The method of producing combined motion picture and sound record films which consists in recording on a wax cylinder a record of audible sounds of performers being photographed, revolving said cylinder so that its peripheral rate of travel corresponds with that of any given length of film photographed, obtaining from such cylindrical record, a metal matrix, cutting the sound record into a long strip spirally between the spirals of the sound grooves, and impressing such strip to the picture film so that the sound record and picture will be in exact synchronism when reproduced.

5. The method of producing combined picture and sound record films which consists in operating a sound recording blank and a motion picture camera operating means from the same source of power whereby the camera operating means and the blank are driven at a uniform rate and the linear distance traveled on the blank is equivalent to the length of film exposed, forming a metal matrix from the sound record, cutting the matrix into a strip including a single continuous trough of sound wave recordations, and impressing the edge of the picture film against the strip of matrix so as to match the series of views with the sound record that was recorded on the blank when the views were being photographed.

In testimony whereof I hereto affix my signature.

JOHN KAISER.